Figure 1:
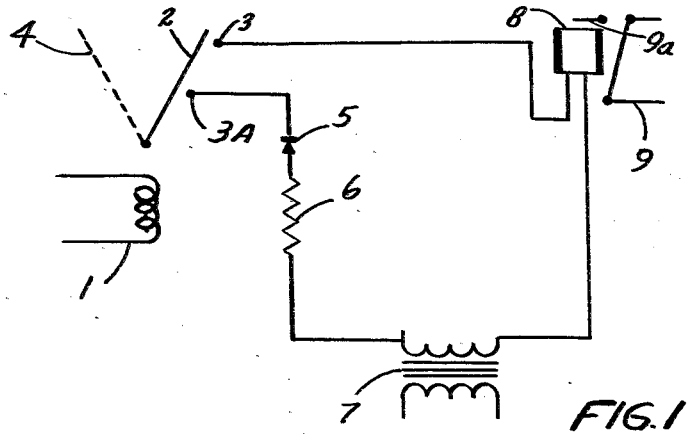

May 22, 1962     F. LICHTGARN     3,036,235
GAS CONTACTING RELAYS

Filed Feb. 1, 1960     2 Sheets-Sheet 1

INVENTOR.
BY Fred Lichtgarn

United States Patent Office 3,036,235
Patented May 22, 1962

3,036,235
GAS CONTACTING RELAYS
Fred Lichtgarn, 34 Franklin St., Northlake, Ill.
Filed Feb. 1, 1960, Ser. No. 5,714
5 Claims. (Cl. 313—149)

This invention relates to electrical amplifying devices. More specifically this invention is a form of a specialized sensitive relay of novel design.

Electrical amplifiers of the meter relay type are well known and they give good service. However they have limitations which this invention seeks to overcome. Since these meter relays have conventional but small size contact points, and because the available torque is also small, the amount of current that can be handled by these contacts is limited. Problems also exist when small permanent magnets are used to augment the closing torque and thus provide greater contact pressures because then the meter movement alone can not break the contacts to open the circuit.

Other meter type relays are in use that have an extra winding on the meter coil to cause an augmented auxiliary current to take over and thus provide the necessary extra torque for more adequate contact pressure. This form of relay requires precision workmanship and therefore is costly.

One of the main objectives of this invention is to provide a sensitive meter type relay that requires a minimum of precision workmanship because it eliminates the use of conventional metal contacts and substitutes the use of gaseous ionized conduction which does not require any physical contact in order to carry a current.

Another objective is to provide a meter relay that can break the circuit by itself without the need for supplementary winding coils, auxiliary contacts or magnets or other means. Because of the manner by which an ionized gas can conduct a current by jumping a gap, we have here a simple means by which a current may be made or broken with a very minimum of torque requirements.

Another objective is to provide a low cost relay that can be used in countless applications where the relatively high cost of available relays can not be accepted.

Another objective is to provide a relay of simple construction in which precise workmanship with its need for precision alignment of parts is of relatively little importance since the actual conduction takes place through a gaseous medium which will jump a gap.

Another objective is to provide a simple relay which is relatively trouble-free because gaseous conduction does not "wear" the contacts to cause "sticking," and because there are no "release" problems associated with physical metallic contacts which depend on physical touching.

Another objective is to provide a sensitive relay which at the same time is electrically and physically rugged.

Another objective is to provide a sensitive meter relay of miniature size.

Still another objective is to provide a meter type relay which can be made more sensitive and responsive than any other type because no extra torque of any kind is needed to cause its "gas contacts" to close or open.

A brief description of this gas contacting relay is as follows: A conventional microampere electric meter movement is sealed in a container filled with an ionizable neon mixture gas. The pointer of the meter is made of metal and it moves in an arc in response to the input currents. When the pointer so moves it comes closer to "gas contact" terminals hermetically sealed into the said container. A constant high voltage is present at these gas contact terminals. When the pointer approaches these terminals it serves as a bridge or a link so that a current can flow because the gas will ionize and conduct by jumping the gap between the pointer and terminals. The passage of current through the ionized gas then is enough to close a heavier power relay. This explanation is expressed diagrammatically in FIG. 1. Here, the electrical input signal through moving coil 1 causes pointer 2 to move away from the resting zero position (dotted line) 4 to the position shown close to the gas contacting terminals 3 and 3A. Note that the pointer does not have to physically touch the gas contact terminals because the gas, when ionized, will jump the gap and close the circuit. A source of A.C. voltage comes from the secondary of transformer 7 and is limited by resistor 6 and is rectified by rectifier 5. The circuit is completed through the coil of power relay 8. Then when this relay 8 is energized contacts 9 and 9A carry the power load.

It is to be understood that the pointer and the gas contacting terminals may be "treated"—if desirable—with radioactive materials so as to cause ionization at a lower applied voltage.

It is to be further understood that all manner of modification may be made by those familiar with the arts involved and yet not depart from the spirit and scope of this invention.

Figure 2:
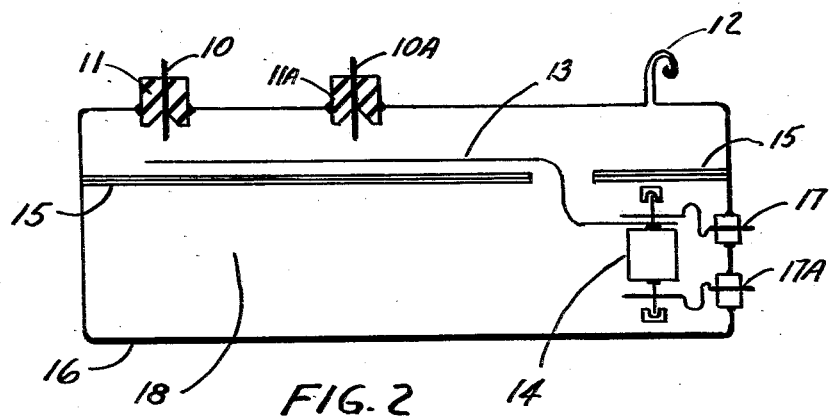

In FIG. 2 we have a cross-sectional view of a typical gas contacting relay. For purposes of clarity the magnetic structure is not shown because the moving coil is almost completely surrounded by it. The conventional meter construction is too well known and too old in the arts to need any further detailing. The gas-tight case 16 contains the gas to be ionized 18. A tabulation 12 serves to both remove the original air and to introduce the neon gas, after which it is crimped and soldered. The input signal is applied to the moving coil through the sealed terminals 17 and 17A. The pointer 13 swings in an arc and is normally away from the gas contacting terminals 10 and 10A which are supported and sealed by the insulators 11 and 11A. When a signal is applied pointer 13 moves until it comes close to the gas contacting terminals. When this happens the gas mixture ionizes and the output circuit "closes." It will be noted that the arc of travel of the pointer is normally restricted and it comes to a fixed stop 22 in FIG. 3. Thus any input signal from the minimum needed to swing the pointer to a position near this fixed stop to a signal which is an overload will also come to this fixed stop position which is the most favorable for gas ionization to take place.

Control over the range of meter response may be made by several ways. One simple method would be to place a rheostat across the meter input and vary it for required amount of shunting. Another method would be to vary the voltage applied to the gas contacting terminals by a variable rheostat. Another method would be to make the coil spring tension adjustable by an external permanent magnet. This would give a "suppressed zero" type of response. Another method of varying the sensitivity and range of response would be to place the permanent magnet of the meter on the outside of the case which would necessarily be made of a non-magnetic metal, and make this permanent magnet adjustable. In this way we could change the magnetic strength of the field around the moving coil at will.

Figures 3, 4:
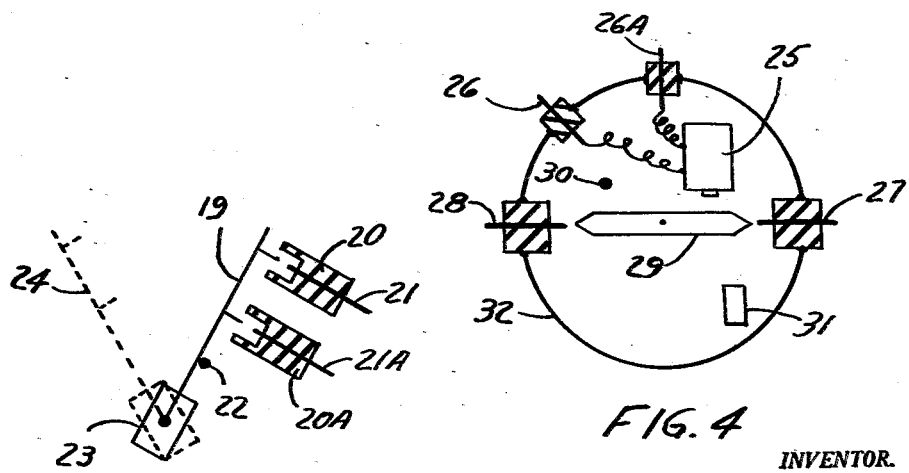

In FIG. 3 we have a plan view of a modified arrangement of the pointer assembly 19 and the gas contacting terminals 21 and 21A. Insulators 20 and 20A are shaped to shield the interior ends or tips from each other. If necessary for some applications or by some different gas mixtures or pressures, the recesses in the insulators 20 and 20A may be made deeper than are illustrated. This will minimize the chances for the gas between the tips to ionize without the bridging effect of the extended tips on the pointer 19 which enter into the recesses when the pointer is energized and swings towards the gas contacting terminals. The stop pin 22 can be made either fixed or adjustable by an external permanent magnet acting through the case. The moving coil is 23. Normally the pointer is at the position shown by dotted line 24. With a signal applied to coil 23 the pointer which is fastened to the coil moves in an arc until it is stopped at pin 22.

It is to be understood that the pointer which is normally made of one piece of metal may be electrically and physically separated from the moving coil by having a section of it made of glass or plastic. Thus none of the high voltage of the output circuit can come near to the input circuit.

In FIG. 4 we have a variation of the basic idea by using a stationary coil instead of a movable coil. Sealed case 32 contains an ionizing gas 33. A movable member 29 is balanced with a bearing in the center. It may be made like a compass or it may be balanced horizontally. If like a compass the movable member is returned to a zero position by a permanent magnet 31. If like a horizontal beam the return to zero is made by the gravity. In either case an electromagnet 25 acts to bring the tips of the movable member to a position where the high voltage can jump the smaller gaps from the gas contacting terminals 27 and 28. Terminals 26 and 25A bring the input signal to the electromagnet 25.

Figure 5:
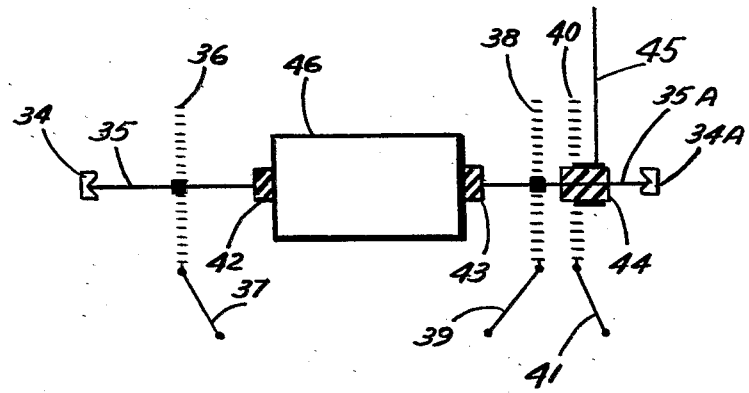

In FIG. 5 one method of providing an electrically insulated movable pointer contact is shown. The jewelled bearings 34 and 34A hold pivots 35 and 35A in place. These pivots are fastened to insulators 42 and 43 which in turn are fastened to the moving coil 46. The wire winding on the moving coil attaches to each pivot and then metal coil springs 36 and 38 carry the electrical circuit to fixed terminals 37 and 39. The pointer is secured onto an insulating fixed collar 44 fastened to pivot 35A and moves with it. Metal coil spring 40 connects with the pointer 45 and the fixed terminal 41.

For some applications the fixed terminal 41 would be brought out through an insulated bushing. In other applications terminal 41 would be internally "grounded" to the case or container.

Figure 6:
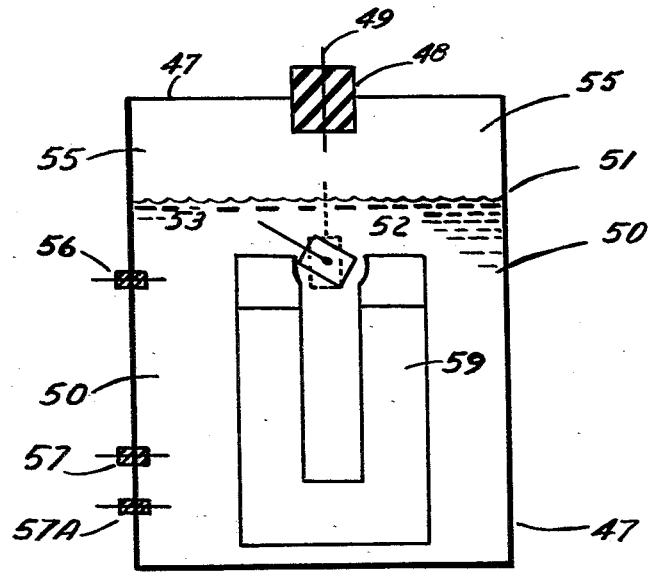

In FIG. 6 we have a sealed container 47 in which a meter movement assembly including a moving coil 52 and a pointer contact 53 which is submerged normally under insulating oil 50. This oil may be almost any light bodied low viscosity non-inflammable oil like the silicones. Above the oil level 51 is an ionizing gas 55 which can ionize when a high voltage is applied across it from gas contacting terminal 49 which is insulated by insulator 48 to pointer contact 53 when it is in the energized position, out of the oil, as shown by dotted line 54.

Pointer contact 53 is normally sharp pointed so that it can break any surface tension on the oil surface and, also, to break through any adherent oil film that may cling to it as it emerges up out of the oil. Sealed terminal 56 carries a lead wire that connects to spring 40 as illustrated in FIG. 5. The magnetic structure 59 is conventional.

There are several advantages to operating with the pointer (movable contact) submerged under oil.

First, the oil serves as an efficient "damper" to iron out any transients and other minor small electrical disturbances. Only a sustained input signal can rotate the moving coil. Pulses and intermittents would not, in general, move the highly damped movement. For some types of applications this may be helpful.

Secondly, a much higher voltage may be applied across the gas contacting terminals without any danger of this voltage "jumping" or prefiring itself because the pointer is effectively insulated up to the instant that it breaks through the top of the oil surface and enters the neon gas zone.

Thirdly, the oil serves to prevent both mechanical and thermal damage in the event of an overload. The oil makes the instrument relatively immune to overloads that would destroy a meter in a "dry" condition.

Fourth, with the oil being such an efficient insulator, the pointer has only to just submerge itself and the output circuit would be immediately broken. Conversely the pointer must only just emerge and the output circuit is made-specially if a higher than normal high voltage is applied which may be from 300 to 500 volts and more. Thus only a relatively tiny amount of movement of the moving coil is all that is needed to either make or break the output circuit. In the "dry" form of this invention a much greater distance of movement must take place to make or break the output circuit.

It must be noted that many other types of construction may be made to work out that will use the ionizing gas contacts-simple springs with one end fixed—or voice coil type of movement could be designed to break and make a gas ionization gap jumping mechanism—all based on my disclosure.

It is to be understood that any single ionizing gas or a mixture of several gases including mercury vapor may be used depending on the application.

Having now described my invention, I claim:

1. In an electrical current amplifying relay the combination of a hermetically sealed housing filled with an ionizable gas, with an input and output circuit, with the input circuit comprising an electric meter movement actuating a movable first electrode, with said first electrode normally resting at a fixed zero-off position and with said first electrode movable away from said fixed zero-off position and movable towards stationary second electrodes which are a part of the said output circuit when said meter movement is energized by an electric current in said input circuit, with said electrodes co-operating when they are close together to cause the said gas to ionize and thus complete the output circuit, and with said gas to de-ionize and interrupt the said output circuit when said first movable electrode returns back towards its said zero-off position away from said second stationary electrodes when the input current diminishes or is disconnected.

2. A relay as recited in claim 1 in which the said ionizable gas is an inert gas.

3. An electrical current amplifying relay comprising a sealed housing partially filled with a quantity of an insulating oil and leaving a space which is filled with an inert ionizable gas, an electro-mechanical means responsive to an input circuit electrical current to move a first normally submerged electrode up and out of said insulating oil into said gas space, with a second stationary output circuit electrode fixed in said gas space and co-operating with the first electrode when it is lifted up and out of said insulating oil to bring about a condition whereby the said gas becomes ionized and conductive and thus closing the amplified output circuit, and with the said ionized gas condition being automatically interrupted when said first movable electrode recedes back down under the said oil when the said input electric current is diminished or interrupted.

4. In an electrical meter type relay the combination of a sealed casing filled with an inert ionizable gas, electro-mechanical rotative means mounted in said casing and adapted to move a movable first electrode away from a fixed zero-off normal position, two second electrodes fixed mounted within said casing and insulated from said casing, with said first electrode co-operating with said second electrodes when said electro-mechanical means is energized by an input electrical current to cause the said movable electrode to approach the said fixed electrodes for automatically producing an ionized condition of said gas between said two second electrodes whereby an amplified secondary output circuit is completed, with the ionization process being automatically interrupted when said first movable electrode recedes back towards its position of normal zero rest when said input circuit electrical current is reduced or interrupted.

5. In a sensitive electrical current amplifying relay, the combination of an ionizable gas in a sealed housing, a movable first electrode member responsive to a primary input electrical signal current, fixed insulated second electrodes extending through said housing, with the said movable electrode when energized by said input current co-operating with but not physically touching said fixed electrodes and acting to permit thusly the ionization of said ionizable gas to take place and thereby becoming conductive to close an amplified secondary output circuit current.

References Cited in the file of this patent

UNITED STATES PATENTS

| | | |
|---|---|---|
| 1,642,403 | Buchholz | Sept. 13, 1927 |
| 1,834,129 | Loewe | Dec. 1, 1931 |
| 2,315,176 | Zacharia | Mar. 30, 1943 |
| 2,426,209 | Hartley | Aug. 26, 1947 |
| 2,567,413 | Van Ryan et al. | Sept. 11, 1951 |
| 2,590,168 | Felici | Mar. 25, 1952 |
| 2,887,604 | Bodine et al. | May 19, 1959 |